United States Patent
Lafleur

(12) 
(10) Patent No.: US 6,776,282 B2
(45) Date of Patent: Aug. 17, 2004

(54) COMPACT DISK STORAGE CASE

(75) Inventor: André Lafleur, Boucherville (CA)

(73) Assignee: Canada Inc., Montreal (CA)

(*) Notice: Subject to any disclaimer, the term of this patent is extended or adjusted under 35 U.S.C. 154(b) by 81 days.

(21) Appl. No.: 10/093,636

(22) Filed: Mar. 11, 2002

(65) Prior Publication Data

US 2002/0134695 A1 Sep. 26, 2002

(30) Foreign Application Priority Data

Mar. 22, 2001 (CA) ............................................. 2341320

(51) Int. Cl.⁷ ............................................... B65D 85/57
(52) U.S. Cl. ...................... 206/308.1; 206/312; 206/309
(58) Field of Search ................................ 206/307, 309, 206/308.1, 312, 472; 220/836, 837, 839; 312/9.47, 9.48

(56) References Cited

U.S. PATENT DOCUMENTS

| 4,084,694 A | 4/1978 | Lainez et al. |
| 4,159,827 A | 7/1979 | Torrington |
| 4,266,784 A | 5/1981 | Torrington |
| 4,463,849 A | 8/1984 | Prusak et al. |
| 4,617,655 A | 10/1986 | Aldenhoven |
| 4,702,369 A | 10/1987 | Philosophe |
| 4,702,533 A | 10/1987 | Seifert |
| 4,705,166 A | 11/1987 | Ackeret |
| 4,728,157 A | 3/1988 | David, Jr. |
| 4,747,484 A | 5/1988 | Ackeret |
| 4,771,883 A | 9/1988 | Herr et al. |
| 4,881,640 A | 11/1989 | Herr et al. |
| 4,899,875 A | 2/1990 | Herr et al. |
| 4,905,217 A | 2/1990 | King et al. |
| 4,964,510 A | 10/1990 | Loyd |
| 5,000,316 A | 3/1991 | Lerner |
| 5,011,010 A | 4/1991 | Francis et al. |
| 5,090,078 A | 2/1992 | Kamakura et al. |
| 5,096,064 A | 3/1992 | Rufo, Sr. et al. |
| 5,101,971 A | 4/1992 | Grobecker |
| 5,170,893 A * | 12/1992 | Smith ......................... 211/40 |
| 5,265,721 A | 11/1993 | Castritis |
| D347,728 S | 6/1994 | Taniyama |
| 5,360,106 A * | 11/1994 | Nakayama et al. ......... 206/309 |
| 5,366,073 A | 11/1994 | Turrentine et al. |
| 5,422,875 A | 6/1995 | Bribach |
| 5,425,451 A | 6/1995 | Blase |
| 5,450,953 A | 9/1995 | Reisman |
| 5,462,158 A | 10/1995 | Kramer |
| 5,495,939 A | 3/1996 | Castritis |
| 5,505,299 A | 4/1996 | Ditzig et al. |
| 5,551,559 A | 9/1996 | Roth et al. |
| D375,015 S | 10/1996 | Kobayashi et al. |
| 5,590,768 A | 1/1997 | Hilton et al. |
| 5,590,769 A | 1/1997 | Lin |
| 5,593,031 A | 1/1997 | Uchida |
| 5,655,656 A | 8/1997 | Gottlieb |
| 5,662,216 A | 9/1997 | Nesbitt et al. |
| 5,676,246 A | 10/1997 | Gloger |
| 5,779,040 A | 7/1998 | Attar et al. |
| 5,799,783 A | 9/1998 | Cheris et al. |
| 5,842,563 A | 12/1998 | Herr et al. |
| 5,878,879 A | 3/1999 | Liao |
| 5,881,871 A * | 3/1999 | Ikebe et al. .............. 206/308.1 |
| 5,906,275 A | 5/1999 | Jokic |
| 5,938,020 A | 8/1999 | Luckow |
| 5,944,180 A | 8/1999 | Koh et al. |
| 5,944,181 A | 8/1999 | Lau |

(List continued on next page.)

Primary Examiner—David T. Fidei
(74) Attorney, Agent, or Firm—Hoffman, Wasson & Gitler

(57) ABSTRACT

The present invention relates to a case for storing and retrieving a disk such as an optical compact disk and accompanying printed material. More particularly, the invention relates to a compact disk case (CD case) from which the disk can be extracted using only one hand without opening the lid, although the case can be made out of a single part.

24 Claims, 3 Drawing Sheets

U.S. PATENT DOCUMENTS

| | | |
|---|---|---|
| 5,984,093 A | 11/1999 | Frick |
| 6,006,541 A | 12/1999 | Taylor |
| 6,016,909 A | 1/2000 | Chang |
| 6,021,894 A | 2/2000 | Lakoski et al. |
| 6,029,848 A | 2/2000 | Cha et al. |
| 6,409,014 B1 * | 6/2002 | Hummell et al. ........ 206/308.1 |
| 6,467,616 B2 * | 10/2002 | Hegarty et al. .......... 206/308.1 |

* cited by examiner

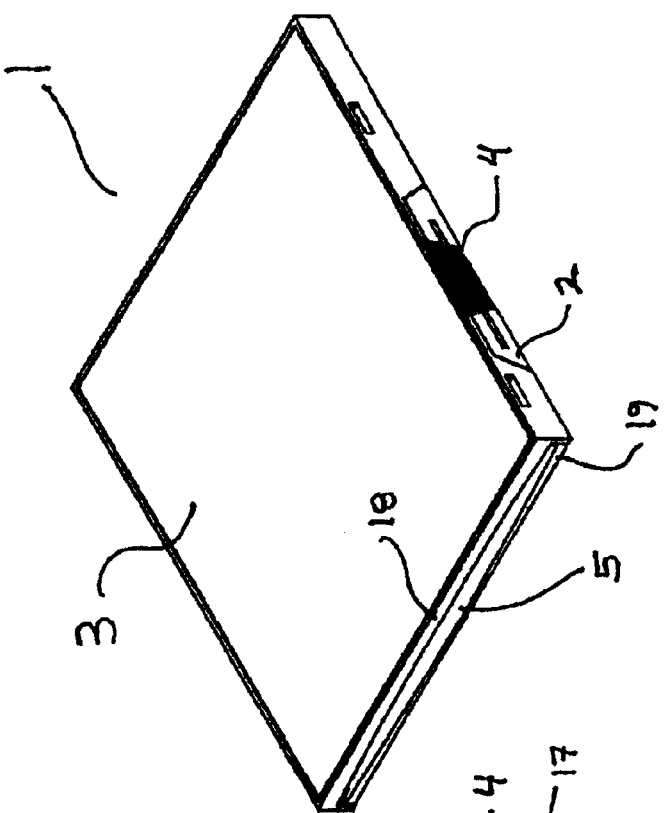
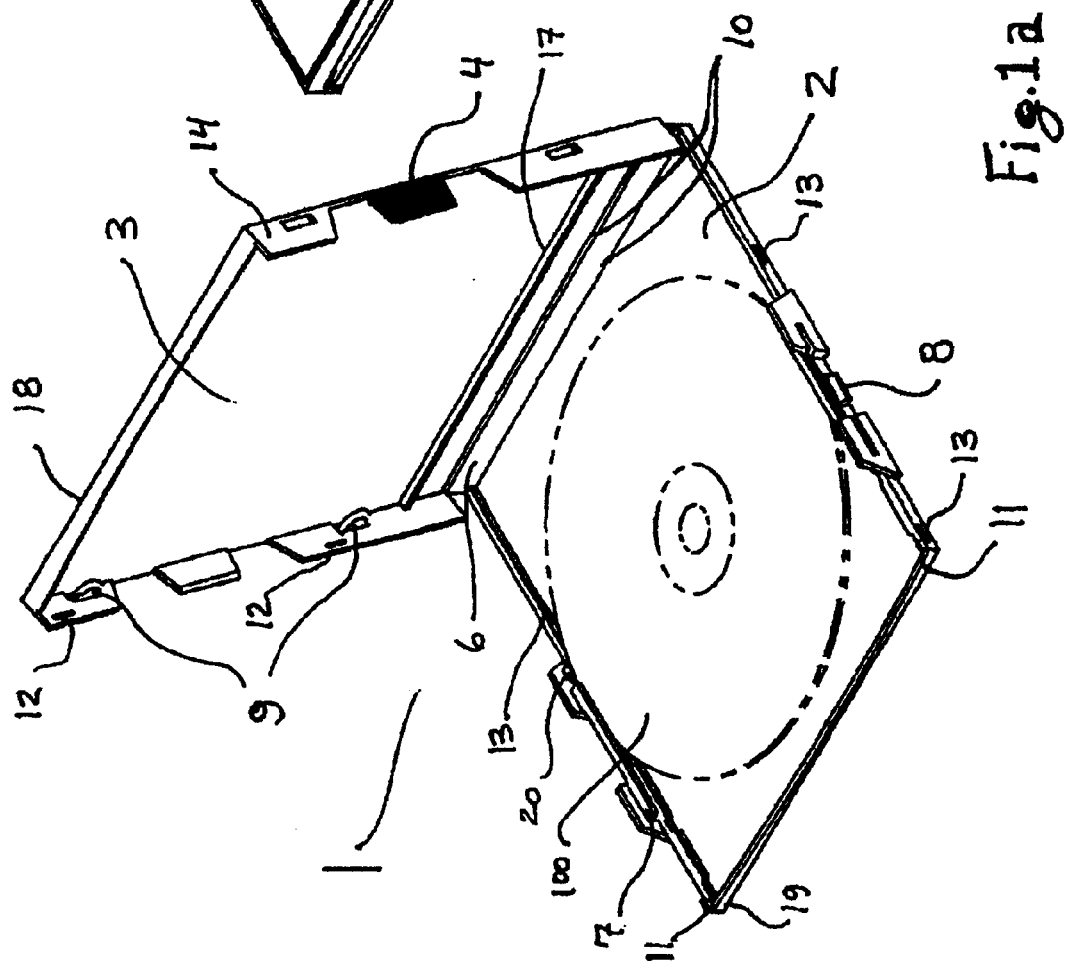

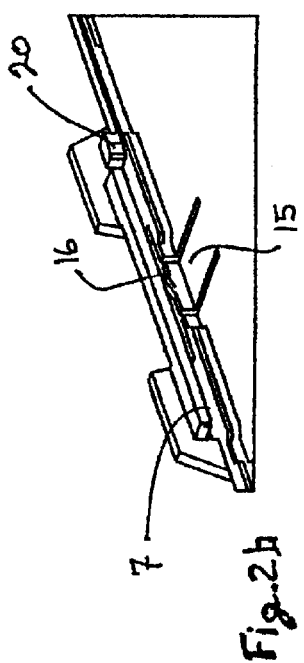
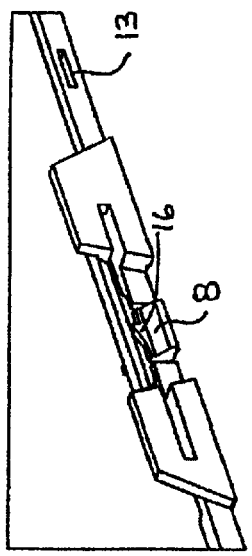
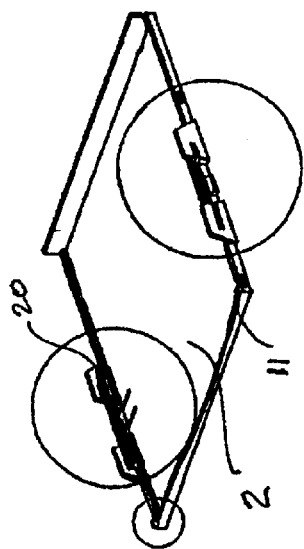
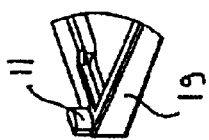

COMPACT DISK STORAGE CASE

BACKGROUND OF THE INVENTION

1. Field of the Invention

The present invention relates to a case for storing and retrieving a disk such as an optical compact disk and accompanying printed material. More particularly, the invention relates to a compact disk case (CD case) from which the disk can be extracted using only one hand without opening the lid, although the case can be made out of a single part.

2. Brief Description of the Existing Art

In the decade, compact optical disks have been gradually replacing vinyl disks for the recording of audio material and are currently used for storing and reading various types of digital information including video material. Therefore, enormous quantities of recorded or bare compact optical disks are produced and used in different fields of application and must be properly protected and identified using a storage case. Generally, a rigid three part clear plastic case is used for that purpose. Such CD cases are made from brittle plastic material such styrene and present mechanical weaknesses so that cases are frequently damaged by manipulation or dropping and must be replaced. Furthermore, such an accident as dropping the case with a CD inside can result in also damaging the enclosed CD itself as it is sometimes projected outside of the case falling apart.

Numerous types of CD cases have been proposed in the prior art in a attempt to improve the mechanical resistance of CD cases and facilitate their manipulation. However, most designs turn out to be complex, comprise too many parts, are costly and above all, they often fail to comply with the established critical dimensional industrial standards and consequently would not fit in standard racks and carrying cases. Indeed, most alternate concepts of the prior art are unable to match the standard case's width that exceeds disks diameter by only a few millimeters.

The known concepts presenting the most interest are providing a mechanism that enables pulling out the disk from the case without opening the lid, thus making manipulation easier and reducing the risk of dropping the case and/or the disk. However, most (if not all) of the known concepts do not allow to insert the accompanying printed material provided with CDs.

Examples, such compact disk cases, are described in U.S. Pat. No. 4,702,369, granted to Philosophe in 1987, U.S. Pat. No. 5,422,875, granted to Bribach in 1995, U.S. Pat. No. 5,593,031 granted to Uchida in 1997 and U.S. Pat. No. 5,662,216 granted to Nesbitt et al in 1997.

Philosophe teaches a storage container for records or the like, comprising a manually pulled drawer-like receptacle containing the record and a mechanically assembled lid. The costly concept involves at least three moulded moving parts and complex manipulation to pull-out the record and replace it in the container. Similarly, U.S. Pat. No. 5,422,875 describes an optical disk accommodation device provided with a spring loaded drawer and a mechanically assembled lid. The spring mechanism enables removal and insertion of the disk with a single hand but implies additional parts and costs. Moreover, the overall width of the device exceeds disk diameter too much to fit in standard racks and carrying cases. The lid assembly characterizing both of these concepts also involves weak rigid plastic tabs and pins susceptible to breakage.

Bribach teaches an assembled pocket for holding and protecting a compact disk, which comprises a live hinge lid. The closed pocket has an open side and movement of the disk on the direction of said open side is restricted by two locking protrusions disposed about the peripheral boundary of the disk, spaced from each other by a distance lightly less than the diameter of the disk and located slightly passed its central axis. The disk can be pulled by hand against the friction applied by the locking protrusions, which requires both hands for disk removal even in the lateral sliding mode (lid closed). Protrusions are subjected to substantial wear since no mechanical compliance is provided and again the overall width of the pocket significantly exceeds that of standard CD case.

The Nesbitt patent presents a concept enabling removal of disk through a side opening in the case using a single hand, but without a sliding drawer. Movement of the disk in the direction of the slot is prevented by two protrusions as in Bribach, except that each of said protrusions is mounted on a compliant arm provided with a tab. In the basic embodiment, compression of the compliant members by the fingers of one hand of a user causes protrusions to space apart and free the disk. Downward tilting of the case then enables dropping of the disk off the case by gravity. Nevertheless, that concept again comprises at least three molded plastic parts, an assembled lid with weak parts and can not respect the width limitation of standard existing cases, given the large protrusion bearing arms extending over the periphery of the disk.

There is thus a need for an improved CD case featuring high mechanical strength and low cost, while enabling one hand operation and complying with width standards established by CD cases currently existing on the market.

OBJECTS OF THE INVENTION

The present invention provides a case for the storage of optical compact disks which overcomes the limitations and drawbacks of the above mentioned solutions of the prior art, and more specifically:

a first object of he present invention is to provide compact disk storage case comprising a single part;

a second object of the present invention is to provide, compact disk storage case that can be manufactured economically by plastic molding;

a third object of the present invention is to provide compact disk storage case featuring high mechanical strength and low susceptibility to impact breakage;

a fourth object of he present invention is to provide compact disk storage case enabling extraction of the disk from a slot on a side thereof using a single hand;

a fifth object of he present invention is to provide compact disk storage case comprising lid and base portions in which accompanying printed material can be inserted, retained or removed; and a sixth object of he present invention is to provide, compact disk storage case featuring an overall width not exceeding that of existing cases, so to ensure compatibility with existing racks and caddies.

SUMMARY OF THE INVENTION

More specifically, in accordance with the invention as broadly claimed, there is provided a compact disk storage case comprising a base portion receiving a compact disk having a diameter, and a lid portion connected to the base portion through at least one live hinge. The case can advantageously comprise a single part that can be obtained by molding of compliant plastic material such as polypropylene. Both the base and the lid comprise integral tabs for retaining printed material. When the lid is closed over the base portion, a narrow elongated slot is formed in a side wall of the case, from which the disk can be inserted in the case or removed therefrom without opening the lid portion.

The disk is normally retained into the base portion by a three point stop system constituted by a back wall, substantially orthogonal to the plane of the base portion, engaging a first point of the disk periphery opposed to the slotted side of the case, and two tab mounted locking protrusions having a distance between the protrusions slightly less than the diameter of the disk and located slightly more than half of said diameter from the back wall, thus limiting the movement of the disk toward the slotted side of the case.

A second pair of tabs located on the lid portion is aligned with corresponding protrusion provided tabs of the base portion when the lid is in a closed position. The mechanical relationship between the lid portion tabs and the base portion tabs is such that applying a lateral pressure on a lid tab causes the corresponding base tab to bend into an orthogonal direction with respect to the base plane, which in turn disengages the associated protrusion from the disk periphery. Simultaneously pressing both top portion tabs, which can be accomplished by synchronous action of the thumb and a finger of a same hand of a user, thus makes the disk free to move in the direction of the case slotted side. Simultaneously orienting the case with the slotted side facing downward then causes the disk to exit the case under the action of the force of gravity.

BRIEF DESCRIPTION OF THE DRAWINGS

FIG. 1A is an isometric view of the CD case of the present invention, shown in an open lid position showing a compact disk stored inside;

FIG. 1B an isometric view of the CD case of the present invention shown in a closed lid position;

FIG. 2A is an isometric partial view of the CD case of the present invention, showing the details of the base portion;

FIG. 2B is an enlarged isometric view of portion B of FIG. 2a, showing the details of a disk locking system as viewed from the inside of the CD case;

FIG. 2C is an enlarged isometric view of portion C of FIG. 2a, showing the details of disk and lid locking systems as viewed from the outside of the CD case;

FIG. 2D is an enlarged isometric view of portion D of FIG. 2a, showing the details of a lid locking system and CD retaining system of the CD case;

Similar reference numerals refer to similar parts throughout the various Figures.

DETAILED DESCRIPTION OF THE DRAWINGS

Figure 3C:
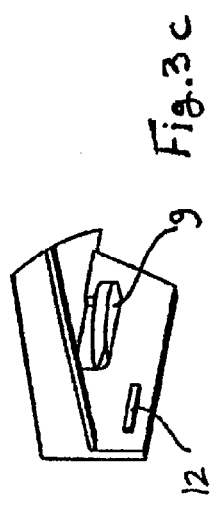
FIG. 3C is an enlarged isometric view of portion C of FIG. 3a, showing the details of a printed matter retaining tab of the lid portion of the CD case.
Figure 3B:
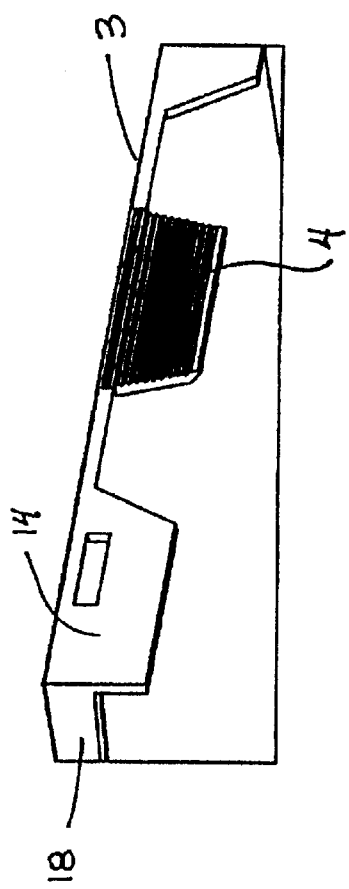
FIG. 3B is an enlarged isometric view of portion B of FIG. 3a showing the details of a disk release tab portion of he CD case.
Figure 3A:
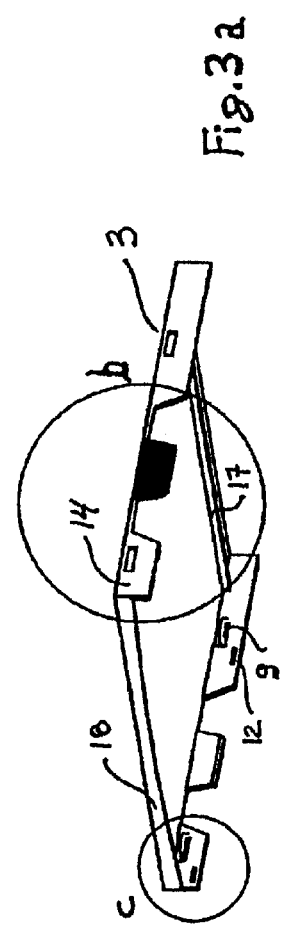
FIG. 3A is an isometric partial view of the CD case of the present invention, showing the details of the lid portion.

A preferred embodiment of the CD case according to the present invention will now be described in detail referring to the appended drawings.

Referring to FIG. 1, there is illustrated a CD case generally identified by numeral 1 for holding disks such as compact optical disk 100.

CD case 1 is preferably made of a single part obtained by injection molding of compliant plastic material such as polypropylene, featuring high impact resistance and being suitable for producing long life live hinges. In addition, a material such as polypropylene enables production of cases in light translucent colors allowing detailed appreciation of printed material inserted inside a closed case and seen through the walls thereof. The CD case comprises a base portion 2 and a lid portion 3 connected to a hinge member comprising a back wall portion 6 extending between two (2) live hinges 10 to enable opening and closing of the case. Although a fixed back wall and a single live hinge could be used, the present arrangement induces less mechanical constrains into hinges and makes manufacturing easier.

The case is then maintained in the closed position thanks to at least one pair of ridges 12 (better seen in FIG. 3c—two pairs shown) provided on the inner surface of flanges 14, said ridges mating with corresponding slots provided at the periphery of the base portion 2. As better seen on FIG. 1b, when the CD case is set in its closed position, wall 19 of base portion 2 and wall 18 of lid portion 3 cooperate to form an elongated curved edge slot 5 in a side wall opposed to back wall 6 of the case. The slot 5 is so dimensioned to enable easy insertion of a compact disk such as 100 therethrough.

It is worth mentioning that the center portion of slot 5 is wider than the ends thereof to facilitate insertion, while the narrower ends gradually provide, with progressing insertion, proper alignment of the disk 100 into the center passages of two "U" shaped rails 7 provided on opposite sides of the base portion 2. The curved profile of slot 5 is also meant to better retain printed material and prevent insertion of disk in printed material. Slot 5 also serves to open the CD case by pulling walls 18 and 19 away from each other.

It should also be noted that at least two pairs of tabs 9 (better seen in FIG. 3c) are provided on the sides of the lid portion 3 and cooperate with the inner face wall 18 and the stop bar 17 to receive and retain printed material as provided in currently available CD cases. Similarly, small tabs (not shown) on the inside of base portion 2 collaborate with the inner face of walls 6 and 19 to enable retention of printed material. The compliant translucent plastic material constituting the case enables a user to read printed indicia through the face of thereof.

FIGS. 2a–2d show the details of the base portion 2. On the close-up view of one of two symmetrical sides of the base portion provided by FIG. 2b, it can be seen that the base portion 2 is provided with a pair of tabs 15 each terminated by a locking protrusion 16 extending within the center passage of the rails 7. Since compliant plastic material is used, tabs 15 act as leaf springs so that each of the locking protrusions 16 is able to clear the passage of rail 7 when a slight generally downward pressure is applied thereon or on a portion of the corresponding tab 15 such as beveled end portion 8. It can be further observed that protrusions 16 comprise a sloped front edge and a substantially vertical back edge. Therefore, in operation, when a disk 100 is inserted through slot 5 of the closed CD case 1, it is guided through the center passages of rails 7 and two points of its leading edge eventually hit the sloped edges of locking protrusions 16. A predetermined slight pressure applied on the disk in the direction of the axis of rails 7 will then produce a vertical force component applied against the spring return force of tab 15, causing protrusions 16 to move downward and clear the passage of rails 7, thus allowing the disk to slide toward the rear of the case with the top protrusions slipping on the lower surface of the disk near the periphery.

The distance between protrusions 16 is slightly less than the diameter of disk 100 and the distance between the rear edge of the protrusions and the rear wall 6 of base portion 2 is at least equal to half of said diameter. Therefore, when the disk is pushed into the closed case 1 through lot 5, its trailing edge eventually passes the back edge of protrusions 16 which are then urged back into the passages of rails 7 by the spring return force of tabs 15. The disk 100 is then locked into the case, its movement being limited toward the back of the case by a pair of resilient stops 20, and toward the front slotted side by the vertical rear portions of locking protrusions 16, extending generally orthogonal to the main surfaces of the disk.

To retrieve the compact disk from the case, locking protrusions 16 must be moved downward in order that their vertical back edges be clearing the passages in rails 7, thus enabling disk 100 to move toward slot 5 and be partly ejected from the case by gravity. Moving the locking protrusions downward is accomplished by simultaneously applying a force on tab 4 of lid portion 2 when the case 1 is closed, said force being transferred to the beveled portion 8 of corresponding tabs 15, in turn creating a downward force component on said tabs, inducing downward displacement of the tab and locking members and liberating the disk. A pair of retaining cleats 11 (better seen in FIG. 2*d*) are provided on the base portion 2 to prevent disk 100 from slipping completely out of case when inclining the case downward and depressing tabs 4. Indeed, the distance between cleats 11 is slightly less than the diameter of the disk, so that the force of gravity is not sufficient to bring the disk axis beyond the line formed by these two cleats 11, thus retaining the trailing half of the disk inside the case. The disk must then be pulled out by hand to be completely extracted from the case.

When the lid is open, the disk 100 remains firmly in place an is not subject to be dropped inadvertently. Although depressing tab 15 may enable removal of the disk by sliding it out of rails 7, the operation is more easily carried out with the assistance of tabs 4 when lid 3 is closed.

Although the present invention has been described by means of preferred embodiments thereof, it is contemplated that various modifications may be made thereto without departing from the spirit and scope of the present invention. For example, different embodiments of the CD case can be made to convert the force applied on the tabs 4 of the lid portion into a downward force as required to clear locking protrusions 16 from the central passages of rails 7. Accordingly, it is intended that the embodiment described be considered only as illustrative of the present invention and that the scope thereof should not be limited thereto but be determined by reference to the claims hereinafter provided and their equivalents.

Although the present invention has been described by means of preferred embodiments thereof, it is contemplated that various modifications may be made thereto without departing from the spirit and scope of the present invention. For example, different embodiments of the CD case can be made to convert the force applied on the tabs 4 of the lid portion into a downward force as required to clear locking protrusions 16 from the centre passages of rails 7. Accordingly, it is intended that the embodiment described be considered only as illustrative of the present invention and that the scope thereof should not be limited thereto but be determinded by reference to the claims hereinafter provided and their equivalents.

What is claimed is:

1. A compact disk storage case comprising:
    mutually mating base portion and lid portion, the base portion being structured to receive a compact disk having a diameter;
    a front wall with an elongated slot formed when the base portion and the lid portion mate with each other to form the case, wherein the compact disk can be inserted in and withdrawn from the case through the elongated slot without opening the lid portion;
    a multiple-point lock system provided in the case for retaining the compact disk in the case but enabling insertion and withdrawal of the compact disk in and from the case through the elongated slot, the multiple-point lock system comprising:
        at least one rear disk-engaging stop member located, when the compact disk is inserted in the case, on the side of the compact disk opposite the slotted front wall; and
        a pair of front disk-engaging lock members spaced apart from each other by a distance slightly smaller than the diameter of the compact disk and located, when the compact disk is inserted in the case, between the compact disk and the slotted front wall, the front disk-engaging lock members being compliant to deform upon insertion of the compact disk in the case through the elongated slot, and to recover initial shape and position thereof and retain the compact disk in the case between the front lock members and the at least one rear stop member.

2. The compact disk storage case as claimed in claim 1, further comprising:
    integral tabs located at least on the lid portion for retaining printed material.

3. The compact disk storage case as claimed in claim 1, wherein the elongated slot has a central portion and first and second opposite end portions, and wherein the central portion is wider than the end portions to facilitate insertion of the disk.

4. The compact disk storage case as defined in claim 1, wherein the base portion comprises a pair of rails provided on opposite sides of the base portion to receive the compact disk.

5. The compact disk storage case as defined in claim 4, wherein the rails are U-shaped rails.

6. The compact disk storage case as defined in claim 4, wherein each front lock member comprises, on the base portion:
    a compliant tab with a free end; and
    a disk-engaging locking protrusion formed on the free end of the compliant tab and normally extending in a passage defined by a corresponding one of the rails.

7. The compact disk storage case as defined in claim 6, wherein:
    the base portion defines a bottom wall of the case; and
    the compliant tab is flat, integral and coplanar with the bottom wall of the case defined by the base portion.

8. The compact disk storage case as defined in claim 7, wherein the disk-engaging locking protrusion is generally perpendicular to the compliant tab.

9. The compact disk storage case as defined in claim 8, wherein the disk-engaging locking protrusion comprises a sloped front edge and a substantially vertical rear edge.

10. The compact disk storage case as defined in claim 6, wherein:

each front lock member further comprises a beveled face on the free end of the compliant tab; and the lid portion comprises, for each front lock member, a release tab having a free end face cooperating with the beveled face of the compliant tab whereby pressure applied to the release tab will slide the free end face on the beveled face to deform the compliant tab and withdraw the locking protrusion from the passage defined by the corresponding one of the rails in order to enable sliding of the compact disk on the rails out of the case through the elongated slot.

11. The compact disk storage case as defined in claim 4, further comprising a pair of cleats positioned at respective ends of the elongated slot for retaining a compact disk sliding onto the rails out of the case partly inside said case.

12. A one-piece compact disk storage case comprising:

mutually mating base portion and lid portion interconnected through a live hinge, the base portion being structured to receive a compact disk having a diameter;

a front wall with an elongated slot formed when the base portion and the lid portion mate with each other to form the case, wherein the compact disk can be inserted in and withdrawn from the case through the elongated slot without opening the lid portion;

a multiple-point stop system mounted on the case for retaining the compact disk in the case but enabling insertion and removal of the compact disk in and from the case through the elongated slot, the multiple-point stop system comprising:

at least one rear disk-engaging stop member located, when the compact disk is inserted in the case, on the side of the compact disk opposite the front slotted wall; and at least one front disk-engaging stop member integral with the case and located, when the compact disk is inserted in the case, between the disk and the slotted front wall, said at least one front disk-engaging lock member being compliant to deform upon insertion of the compact disk in the case through the elongated slot, and to recover initial shape and position thereof and retain the compact disk in the case between said at least one front lock members and said at least one rear stop member.

13. A compact disk storage case comprising:

mutually mating base portion and lid portion, the base portion being structured to receive a compact disk having a diameter;

a front wall with an elongated slot formed when the base portion and the lid portion mate with each other to form the case, wherein the compact disk can be inserted in or withdrawn from the case through the elongated slot without opening the lid portion;

a back wall opposite to the front slotted wall;

a live hinge system for hingedly connecting the lid portion to the base portion in the region of the back wall;

a multiple-point stop system mounted on the case and comprising:

a pair of front, compliant tabs with respective disk-engaging free end locking protrusions spaced apart from each other by a distance slightly smaller than the diameter of the compact disk and located, when the disk is inserted in the case, between the disk and the slotted front wall; and at least one rear disk-engaging stop member located, when the compact disk is inserted in the case, between the compact disk and the back wall for limiting movement of the compact disk toward the back wall;

whereby, in operation, compliance of the front tabs enable both sliding of the compact disk through the elongated slot between the locking protrusions and retention of the compact disk between the locking protrusions and the at least one rear stop member.

14. The compact disk storage case as defined in claim 13, wherein the live hinge system is a double live hinge system incorporating the back wall.

15. A compact disk storage case comprising:

mutually mating base portion and lid portion, the base portion being structured for receiving a compact disk having a diameter;

a front wall with an elongated slot formed when the base portion and the lid portion mate with each other to form the case, wherein the compact disk can be inserted in and withdrawn from the case through the elongated slot without opening the lid portion;

a live hinge system for hingedly connecting the lid portion to the base portion;

two U-shaped rails respectively provided on opposite sides of the base portion to receive and guide the compact disk upon insertion and withdrawal of said compact disk in and from the case; and two compliant tabs including respective locking protrusions normally positioned within the passages defined by the two U-shaped rails, respectively, the two compliant tabs forming leaf springs that bend to withdraw the locking protrusions from the passages defined by the two U-shaped rails when a downward pressure is applied to the compliant tabs, wherein the protrusions comprise a sloped front edge and a substantially vertical back edge.

16. A compact disk storage case comprising:

mutually mating base portion and lid portion, the base portion being structured to receive a compact disk having a diameter;

a front wall with an elongated slot formed when the base portion and the lid portion mate with each other to form the case, wherein the compact disk can be inserted in and withdrawn from the case through the elongated slot without opening the lid portion;

a multiple-point lock system provided in the case for retaining the compact disk in the case but enabling insertion and withdrawal of the compact disk in and from the case through the elongated slot, the multiple-point lock system comprising:

at least one rear disk-engaging stop member located, when the compact disk is inserted in the case, on the side of the compact disk opposite the slotted front wall; and at least one front disk-engaging lock member integral with the case and located, when the compact disk is inserted in the case, between the compact disk and the slotted front wall, said at least one front disk-engaging lock member being compliant to deform upon insertion of the compact disk in the case through the elongated slot, and to recover initial shape and position thereof and retain the compact disk in the case between said at least one front lock member and said at least one rear stop member.

17. The compact disk storage case as defined in claim 16, wherein the base portion comprises a pair of rails provided on opposite sides of the base portion to receive the compact disk.

18. The compact disk storage case as defined in claim 17, wherein the rails are U-shaped rails.

19. The compact disk storage case as defined in claim 17, wherein said at least one front lock member comprises, on the base portion:
   a compliant tab with a free end; and
   a disk-engaging locking protrusion formed on the free end of the compliant tab and normally extending in a passage defined by a corresponding one of the rails.

20. The compact disk storage case as defined in claim 19, wherein:
   the base portion defines a bottom wall of the case; and
   the compliant tab is flat, integral and coplanar with the bottom wall of the case defined by the base portion.

21. The compact disk storage case as defined in claim 20, wherein the disk-engaging locking protrusion is generally perpendicular to the compliant tab.

22. The compact disk storage case as defined in claim 21, wherein the disk-engaging locking protrusion comprises a sloped front edge and a substantially vertical rear edge.

23. The compact disk storage case as defined in claim 20, wherein:
   said at least one front lock member further comprises a beveled face on the free end of the compliant tab; and
   the lid portion comprises a release tab having a free end face cooperating with the beveled face of the compliant tab whereby pressure applied to the release tab will slide the free end face on the beveled face to deform the compliant tab and withdraw the locking protrusion from the passage defined by the corresponding one of the rails in order to enable sliding of the compact disk on the rails out of the case through the elongated slot.

24. The compact disk storage case as defined in claim 17, further comprising a pair of cleats positioned at respective ends of the elongated slot for retaining a compact disk sliding onto the rails out of the case partly inside said case.

* * * * *